United States Patent
Herron et al.

(10) Patent No.: US 8,234,316 B2
(45) Date of Patent: Jul. 31, 2012

(54) NESTED FILE SYSTEM SUPPORT

(75) Inventors: Andrew Herron, Redmond, WA (US);
Senthil Rajaram, Seattle, WA (US);
Neal R. Christiansen, Bellevue, WA
(US); Malcolm James Smith, Bellevue,
WA (US)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 12/242,123

(22) Filed: Sep. 30, 2008

(65) Prior Publication Data

US 2010/0082714 A1   Apr. 1, 2010

(51) Int. Cl.
*G06F 17/30* (2006.01)
*G06F 13/28* (2006.01)

(52) U.S. Cl. ........ 707/810; 707/812; 707/823; 711/114; 711/170; 711/173

(58) Field of Classification Search .......... 707/609, 707/612, 821–825, 826–831, 809–812, 611, 707/620; 711/6, 205, 164–165, 162, 114, 711/173, 115, 170; 714/8; 709/220–224; 718/1; 717/169–170, 175
See application file for complete search history.

(56) References Cited

U.S. PATENT DOCUMENTS

| | | | |
|---|---|---|---|
| 5,363,487 A | | 11/1994 | Willman et al. |
| 5,546,557 A | * | 8/1996 | Allen et al. ............... 711/111 |
| 5,809,224 A | * | 9/1998 | Schultz et al. ............ 714/6.32 |
| 5,907,672 A | * | 5/1999 | Matze et al. ............... 714/8 |
| 5,956,745 A | * | 9/1999 | Bradford et al. ............ 711/137 |
| 6,119,212 A | * | 9/2000 | Gross et al. ............... 711/173 |
| 6,389,459 B1 | * | 5/2002 | McDowell ................ 709/216 |
| 6,401,215 B1 | * | 6/2002 | Maddalozzo, Jr. et al. .. 714/6.11 |
| 6,421,684 B1 | * | 7/2002 | Cabrera et al. ............. 707/802 |
| 6,530,038 B1 | * | 3/2003 | Hughes et al. ............. 714/15 |
| 6,665,786 B2 | | 12/2003 | McMichael et al. |
| 6,757,695 B1 | * | 6/2004 | Noveck et al. ............... 1/1 |
| 6,757,778 B1 | * | 6/2004 | van Rietschote ............ 711/6 |
| 6,886,019 B1 | * | 4/2005 | Cannon et al. ............... 1/1 |

(Continued)

FOREIGN PATENT DOCUMENTS

WO   WO 2007/140260   * 12/2007

OTHER PUBLICATIONS

Brian D. Carrier, "Volume analysis of disk spanning logical volumes", Digital Investigation (2005) 2, 78-88.*
Brian D. Carrier, "Volume analysis of disk spanning logical volumes", Digital Investigation (2005) 2, 78e88.*

(Continued)

*Primary Examiner* — Srirama Channavajjala
(74) *Attorney, Agent, or Firm* — Capitol City TechLaw; Richard C. Irving

(57) ABSTRACT

A processing device and a machine-implemented method may be provided for tracking file system dependencies with respect to a volume residing on a storage device and guest volumes residing on virtual storage devices nested within the volume. A shim driver may receive an indication of a virtual storage device being surfaced and may parse contents to surface partitions and volumes contained within the virtual storage device to a system. The shim driver may open a guest volume nested within a host volume and may send a register request, regarding the guest volume, to a virtual disk mini-filter associated with the host volume. The virtual disk mini-filter may save information regarding a relationship between the host volume and the guest volume. The saved information may be used to prevent file system corruption when the host volume is dismounted or unexpectedly removed.

20 Claims, 9 Drawing Sheets

U.S. PATENT DOCUMENTS

| | | | |
|---|---|---|---|
| 6,993,603 B2 | 1/2006 | Pudipeddi et al. | |
| 7,127,585 B2* | 10/2006 | Shimada et al. | 711/173 |
| 7,424,637 B1* | 9/2008 | Schoenthal et al. | 714/6.2 |
| 7,657,584 B2* | 2/2010 | Kawamura et al. | 707/610 |
| 2002/0147736 A1* | 10/2002 | Isip, Jr. | 707/200 |
| 2003/0005248 A1* | 1/2003 | Selkirk et al. | 711/165 |
| 2003/0023826 A1 | 1/2003 | Mcmichael et al. | |
| 2003/0182330 A1* | 9/2003 | Manley et al. | 707/205 |
| 2004/0128443 A1 | 7/2004 | Kaneda | |
| 2004/0205296 A1* | 10/2004 | Bearden | 711/129 |
| 2005/0216665 A1* | 9/2005 | Takakuwa | 711/114 |
| 2005/0246401 A1* | 11/2005 | Edwards et al. | 707/205 |
| 2005/0283583 A1* | 12/2005 | Asano et al. | 711/170 |
| 2006/0010169 A1* | 1/2006 | Kitamura | 707/200 |
| 2006/0010287 A1* | 1/2006 | Kim | 711/112 |
| 2006/0085610 A1* | 4/2006 | Iwamura et al. | 711/162 |
| 2006/0129877 A1 | 6/2006 | Yamamoto et al. | |
| 2007/0143563 A1* | 6/2007 | Pudipeddi et al. | 711/173 |
| 2007/0294274 A1 | 12/2007 | Kano | |
| 2007/0300081 A1* | 12/2007 | Osmond et al. | 713/193 |
| 2008/0005133 A1 | 1/2008 | Khalidi et al. | |
| 2010/0115222 A1* | 5/2010 | Usami | 711/170 |

OTHER PUBLICATIONS

PCT/US2009/057982, International Search Report and Written Opinion of the International Searching Authority (for application corresponding to the present application), mailed Mar. 31, 2010.

"File System Filter Drivers", Retrieved at <<http://www.microsoft.com/whdc/driver/filterdrv/default.mspx>>, Jul. 10, 2008, p. 1.

Buck, et al., "The Storage Server as Virtual Volume Manager", Retrieved at <<http://ieeexplore.ieee.org/iel2/905/7200/00289774.pdf?tp=&isnumber=&arnumber=289774>>, Twelfth IEEE Symposium on Mass Storage Systems, 1993, pp. 79-86.

Kim, et al., "Volume Management in SAN Environment", Retrieved at <<http://ieeexplore.ieee.org/iel5/7439/20222/00934859.pdf?tp=&isnumber=&arnumber=934859>>, pp. 500-505.

Pfaff, et al., "Virtualization Aware File Systems: Getting Beyond the Limitations of Virtual Disks", Retrieved at <<http://www.stanford.edu/~talg/papers/NSDI06/VAFS-nsdi06.pdf>>, pp. 14.

Ganger, et al., "Soft Updates: A Solution to the Metadata Update Problem in File Systems", Retrieved at <<http://www.stanford.edu/class/cs240/readings/p127-ganger.pdf>>, ACM Transactions on Computer Systems, vol. 18, No. 2, May 2000, pp. 127-153.

* cited by examiner

NESTED FILE SYSTEM SUPPORT

BACKGROUND

Generally, windows operating systems have not supported mounting of nested file system volumes. In such operating systems, each file system volume may operate with no dependencies on other file systems volumes. If a file system performed operations, such as, for example, flushing data, locking a volume, dismounting a volume, or other operations with system wide implications, there was no concern that an operation on one volume would affect operations on other volumes.

Virtual hard disk (VHD), as well as other disk container formats, are emerging technologies that expose an entire virtual disk, which may be encapsulated as one or more files. Like real disks, virtual disks may have partitions, volumes, directories and files.

When a virtual disk, nested within a volume of a real disk, is surfaced to the operating system, a volume included within the virtual disk may be mounted. A dependency exists between the volume of the virtual disk and the volume of the real disk because an operation on the volume of the virtual disk is, in reality, an operation on the volume of the real disk. A number of types of operations may cause file systems on volumes of virtual disks to become corrupted when the types of operations are performed without regard to file system dependencies. Examples of the types of operations may include, but not be limited to:

1. Dismounting a volume of a real disk—A volume of a real disk, which is dismounted before dismounting of all dependent (or nested) volumes may corrupt file systems of the dependent volumes;
2. System shutdown—Shutting down a volume of a real disk before shutting down all of the dependent (or nested) volumes may corrupt file systems of the dependent volumes;
3. Volume snapshot operation (which makes a copy of a volume)—When a volume snapshot operation is performed on a volume of a real disk before flushing data from caches associated with virtual disks having volumes nested within (or dependent upon) the volume of the real disk, the volume snapshot operation may fail after timing out waiting for writes to the nested (or dependent) volumes to complete on the underlying volume of the real disk; and
4. PlugAndPlay (PnP) user interface does not show all volumes (a volume of a real disk and any nested volumes on virtual disks) that are removed when the real disk is removed.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A processing device and a machine-implemented method may be provided for tracking file system dependencies among volumes on real and virtual disks and for tracking dependencies among the volumes to avoid file system corruption. A shim driver may be specific to a container format of a volume of a virtual disk and may include a parser to parse the container format. The shim driver may receive an indication regarding a surfacing of a virtual disk. The shim driver may parse the virtual disk to expose partitions and volumes contained therein. The shim driver may send a registration request to a virtual disk mini-filter whenever the shim driver opens a nested volume. Upon receiving a registration request from the shim driver, the virtual disk mini-filter may keep track of a relationship between the volume and the nested volume by saving information about the relationship.

When information is received regarding dismounting of the nested volume, the shim driver may send an unregister request to the virtual disk mini-filter to delete the information about the relationship between the volume and the nested volume. After all information regarding relationships between a host volume and all dependent nested volumes have been deleted, the virtual disk mini-filter may be disconnected from the host volume and may be unloaded.

When the virtual disk mini-filter receives an indication of a dismount request, with respect to the volume, the virtual disk mini filter may synchronously propagate dismount requests in nesting level order, to the shim driver, with respect to all nested volumes that depend on the volume.

When the virtual disk mini-filter receives a request regarding device relationships, the virtual disk mini-filter may append a list of dependent nested volumes to a corresponding response.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
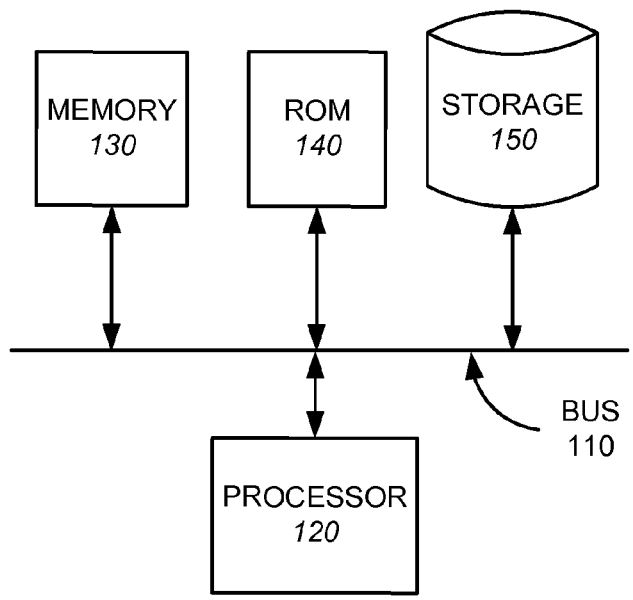
FIG. 1 is a functional block diagram of an exemplary processing device, which may be used to implement embodiments consistent with subject matter of this disclosure.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

A machine-implemented method and a processing device are provided for keeping track of file systems within volumes on real and virtual disks and dependencies among the volumes in order to avoid corrupting dependent volumes and file systems.

In embodiments consistent with the subject matter of this disclosure, an Input/Output (I/O) manager, within a system, may be informed through device discovery mechanisms when a hardware bus reports a change in configuration by addition of a storage device newly attached to a processing device implementing an embodiment of the system. After discovering the newly discovered storage device, the I/O manager may discover one or more partitions on the storage device and may cause any appropriate drivers and file systems to be loaded. For example, the I/O manager module may load a host file system associated with a volume of a real disk (a host volume), When the I/O manager puts forth a request to expose a virtual disk container format as a virtual device, the request may be made to the shim driver which may then open and inspect the virtual disk container. The shim driver may register with a virtual disk mini-filter every time the shim driver opens a file which will be exposed as a guest volume. The virtual disk mini-filter may receive a registration request from the shim driver and may save and keep track of relationships between the host volume and all associated dependent guest volumes. The virtual disk mini-filter may receive notifications of new volumes that may have been made available. When the virtual disk mini-filter receives a notification, the virtual disk mini-filter may send a query down a storage interface to the shim driver to determine if the new disk is virtual or physical. The virtual disk mini-filter may then record relationship information persistently.

When a guest volume is being dismounted, the shim driver may send an un-register request to the virtual disk mini-filter, which may dismount all guest file system volumes on a guest disk in such a way that all data structures are torn down completely without causing any lost writes or data corruption. The virtual disk mini-filter may then delete information regarding a relationship between the guest volume and a host volume. When all information regarding relationships between a particular host volume and all dependent guest volumes have been deleted, the virtual disk mini-filter may be disconnected from the particular host volume and may be unloaded.

A virtual disk mini-filter, attached to a filesystem stack, may save information regarding relationships between a host volume and dependent guest volumes. When the host volume is torn down due to a dismount request, the virtual disk mini-filter may propagate dismount requests for all mounted dependent guest volumes. Further, the virtual disk mini-filter may receive a response to a request for device relationships and may append a list of dependent guest volumes to a corresponding response.

When a host disk, on which the host volume resides, becomes unavailable, the virtual disk mini-filter may propagate information regarding unavailability of the host disk to all the dependent guest volumes, such that updates to the host volume and dependent volumes may be failed immediately and state information of the host disk may be discarded.

Exemplary Processing Device

FIG. 1 is a functional block diagram of an exemplary processing device 100, which may be used to implement embodiments of a system consistent with the subject matter of this disclosure. Processing device 100 may be a desktop personal computer (PC), a notebook or laptop PC, a server, or other processing device. Processing device 100 may include a bus 110, a memory 130, a read only memory (ROM) 140, a processor 120, and a storage device 150. Bus 110 may permit communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may store temporary variables or other intermediate information used during execution of instructions by processor 120. ROM 140 may include a conventional ROM device or another type of static storage device that stores static information and instructions for processor 120. Storage device 150 may include a hard disk and corresponding drive, a flash-based storage device, or other type of data storage device or medium for storing data and/or instructions for processor 120.

Processing device 100 may perform functions in response to processor 120 executing sequences of instructions contained in a tangible machine-readable medium, such as, for example, memory 130, ROM 140, storage device 150 or other medium. Such instructions may be read into memory 130 from another machine-readable medium or from a separate device via a communication interface (not shown).

File System Dependencies

Figure 2:
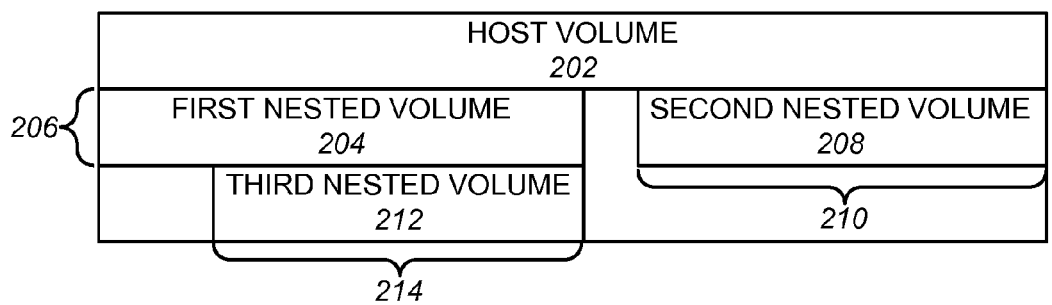
FIG. 2 illustrates an exemplary real disk having stored therein a host volume and dependent nested volumes residing in respective virtual disks.

FIG. 2 illustrates an exemplary removable device, such as a real, or host disk 200, which may be connected to a processing device implementing an embodiment consistent with the subject matter of this disclosure. Host disk 200 may have a host volume 202 residing thereon. A first nested (or guest) volume 204 may reside on virtual disk 206 and may be nested within host volume 202. A second nested (or guest) volume 208 may reside on virtual disk 210 and may be nested within host volume 202. A third nested (or guest) volume 212 may reside on virtual disk 214 and may be nested within first nested volume 204, which is further nested within host volume 202. Host volume 202 may have a host file system associated therewith. First nested volume 204, second nested volume 208, and third nested volume 212 each may have respective guest filesystems associated therewith.

Figure 3:
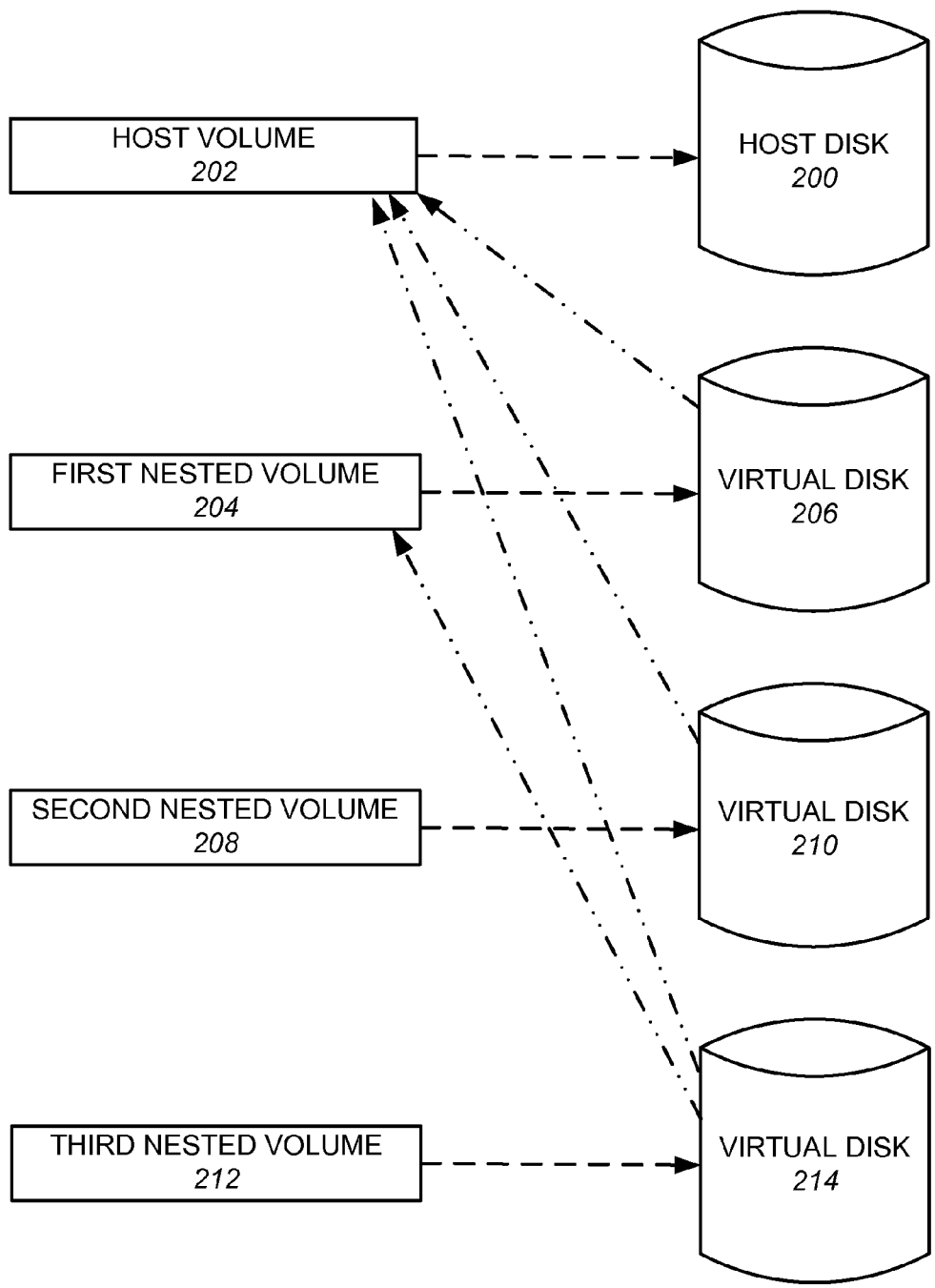
FIG. 3 is a diagram illustrating relationships among the volumes, the real disk, and the virtual disks of FIG. 2.

FIG. 3 illustrates dependencies among the host disk, the virtual disks, the host volume, and the nested guest volumes shown in FIG. 2. Host volume 202 is related to host disk 200 because host volume 202 resides on host disk 200. First nested volume 204 resides on virtual disk 206, which depends on host volume 202 and host disk 200. Second nested volume 208 resides on virtual disk 210, which depends on host volume 202 and host disk 200. Third nested volume 212 resides on virtual disk 214, which depends on first nested volume 204 and virtual disk 206, as well as host volume 202 and host disk 200. Based on the above-mentioned dependencies, one can easily see that when host volume 202 is dismounted or unexpectedly removed, first nested volume 204, second nested volume 208, and third nested volume 212 are affected. Similarly, when first nested volume 204 is dismounted, third nested volume 212 is affected.

Figure 4:
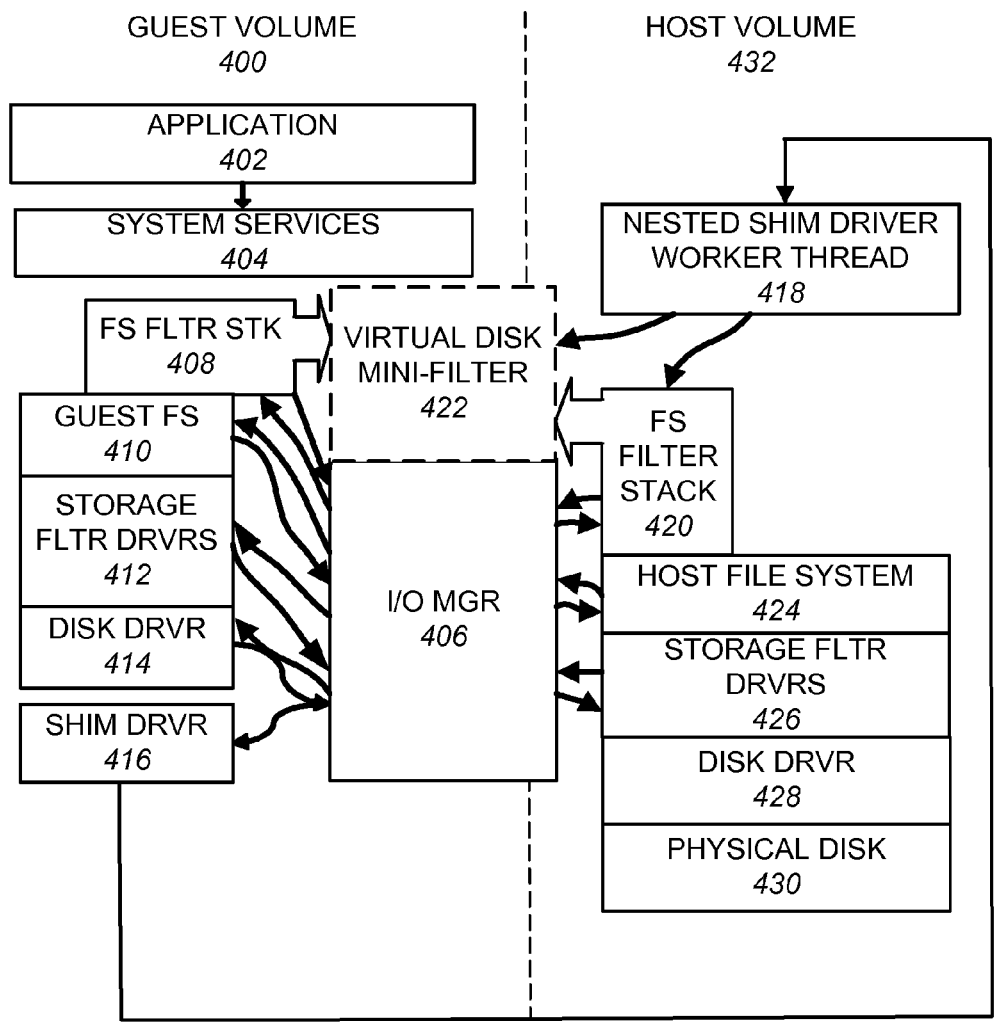
FIG. 4 is a high-level flow diagram illustrating exemplary operations, with respect to a guest volume, being channeled to a host volume and back.

FIG. 4 is a high-level flow diagram illustrating exemplary operations from a virtual, or guest, volume 400 being channeled to a host volume 432 and back. When a virtual disk (not shown) stored on a host volume 432 on a physical disk 430 is surfaced, an I/O manager 406 may load a shim driver 416. Shim driver 416 parses the partitions on the surfaced virtual disk and I/O manager 406 may load the appropriate guest filesystem(s) 410.

Shim driver 416 may send a registration request to a virtual disk mini-filter 422 to register a guest volume 400 residing on a virtual disk. If virtual disk mini-filter 422 is not yet loaded because shim driver 416 did not previously send a registration request to virtual disk mini-filter 422, regarding a dependent volume being added, then virtual disk mini-filter 422 may be loaded onto a filesystem stack, which may include a host file system 424, and storage filter drivers 426. When virtual disk mini-filter 422 receives the registration request, which may include information regarding a relationship between the virtual disk, on which guest volume 400 resides, and host volume 432, on which the virtual disk and guest volume 400 reside, virtual disk mini-filter 422 may save the information.

When host volume 432 receives a query regarding volume and disk relationships, virtual disk mini-filter 422 may append a list of dependent volumes onto a response to a query for device relationships after the response has passed through storage filter drivers 426, host file system 424, and a file system filter stack 420.

When guest volume 400 is being dismounted, shim driver 416 may send an unregister request to virtual disk mini-filter 422, which first, may dismount any guest file systems 410 still loaded on guest volume 400 and then may tear down, or delete, information regarding an associated relationship between the virtual disk, upon which guest volume 400 resides, and host volume 432. When information regarding a last relationship, between host volume 432 and a last virtual disk, upon which a last guest volume of the host volume resides, is torn down, or deleted, virtual disk mini-filter 422 may optionally be disconnected from host volume 432 and unloaded.

When host volume 432 is torn down because of an unexpected removal of physical disk 430, virtual disk mini-filter 422 may receive an indication of the unexpected removal through I/O manager 406 and may send an unexpected removal notification to shim driver 416 for each nested shim driver associated with removed physical disk 430. As a result, shim driver 416 may send a respective unregister request, for each dependent nested volume to virtual disk mini-filter 422. Virtual disk mini-filter 422 may receive each of the respective unregister requests, may send a respective dismount request to any respective guest filesystem 410, and may tear down, or delete, corresponding information regarding a relationship, between host volume 432 and a virtual disk, upon which a respective guest volume resides.

Disk driver 414 may be a driver for a virtual disk and disk driver 428 may be a disk driver for a physical disk 430.

Virtual disk mini-filter 409 may keep track of volumes and devices on which guest volume 400 depends or which depend on guest volume 400.

Exemplary Processing

Figure 5:
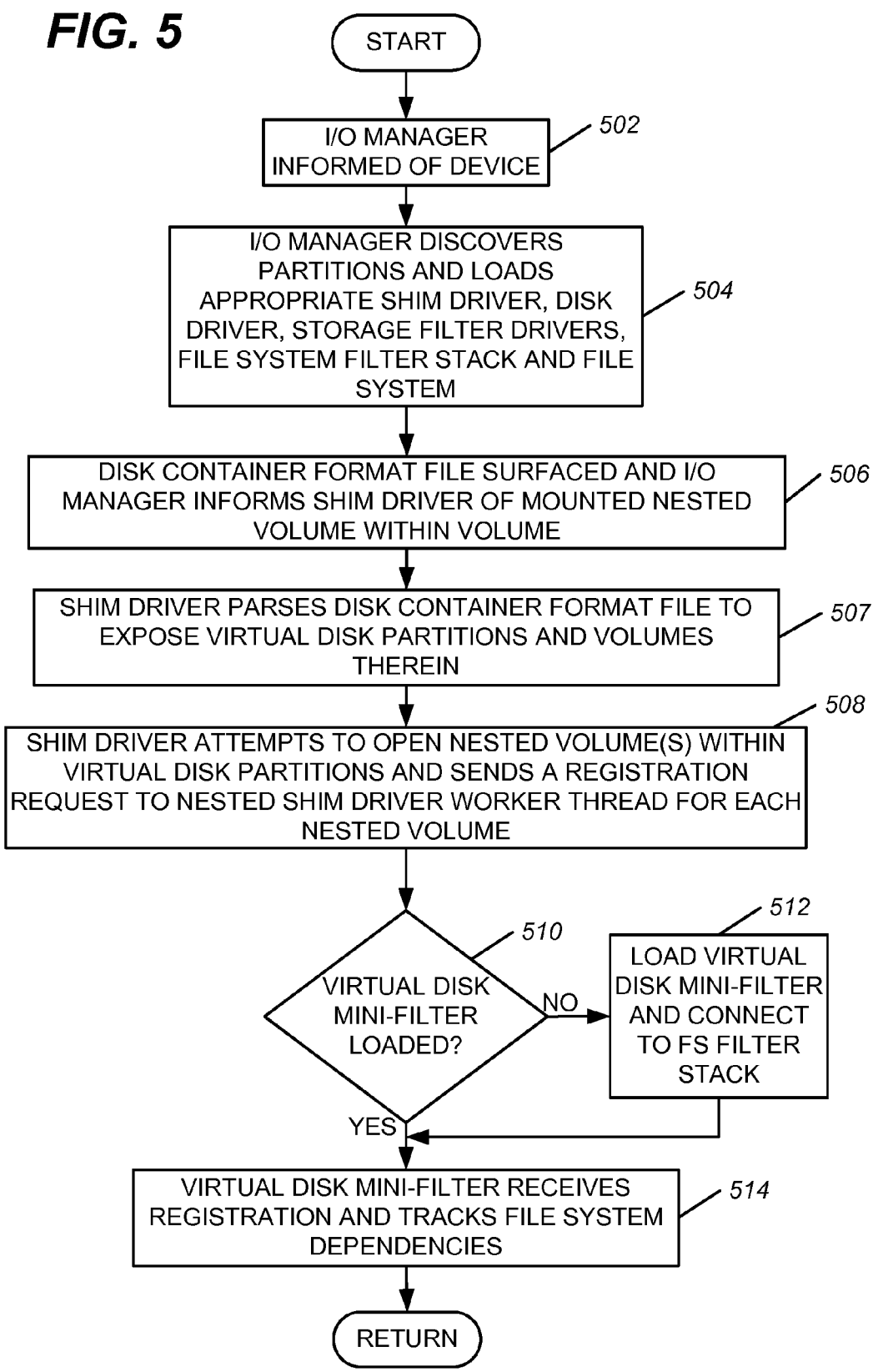
FIGS. 5-10 are flowcharts illustrating exemplary processing, which may be performed by a processing device implementing an embodiment consistent with the subject matter of this disclosure.

FIG. 5, with reference to FIG. 4, is a flowchart illustrating exemplary processing with respect to a removable storage device being newly attached to a processing device. The process may begin with I/O manager 406 being informed regarding the newly attached storage device (act 502). I/O manager 406 may attempt to read the storage device, may discover one or more partitions on a medium of the storage device, and may load an appropriate shim driver 416, disk driver 414, storage filter drivers 412, file system 410, and file system filter stack 408 (act 504). For example, I/O manager 406 may load host file system 424, storage filter drivers 426, and file system filter stack 420, with respect to host volume 432 on the medium, and may load storage filter drivers 412, guest file system 410, file system filters 408, disk driver 414, and shim driver 416.

When a disk container format file on host volume 432 is surfaced as a virtual disk, shim driver 416 may receive an indication regarding the surfacing of the disk container format file (act 506), may parse the disk container format file to expose the virtual disk partitions and volumes therein (act 507), may attempt to open one or more guest, or nested, volumes within the virtual disk partitions, and may send a registration request to nested shim driver worker thread 418 for each of the guest volumes that shim driver 416 attempts to open (act 508). A check may be made to determine whether virtual disk mini-filter 422, associated with host volume 432, is loaded (act 510). If virtual disk mini-filter 422 is not loaded (this may occur only when shim driver 416 sends a registration request for a new or first nested volume within a host volume), then virtual disk mini-filter 422 may be loaded and connected to file system filter stack 420 of host volume 432 (act 512). After loading virtual disk mini-filter 422, or after determining that virtual disk mini-filter 422 is already loaded, virtual disk mini-filter 422 may receive a respective registration request for guest volume 400 from shim driver 416 and may track file system dependencies based on the received respective registration request (act 514). For example, if virtual disk mini-filter 422 receives a registration request for guest volume 400 nested within host volume 432, then the registration request may include information regarding guest volume 400, host volume 432, and the storage device, upon which host volume 432 resides. Virtual disk mini-filter 422 may store the information to keep track of the storage device, host volume 432 stored thereon, and guest volume 400, which is dependent on host volume 432.

Figure 6:
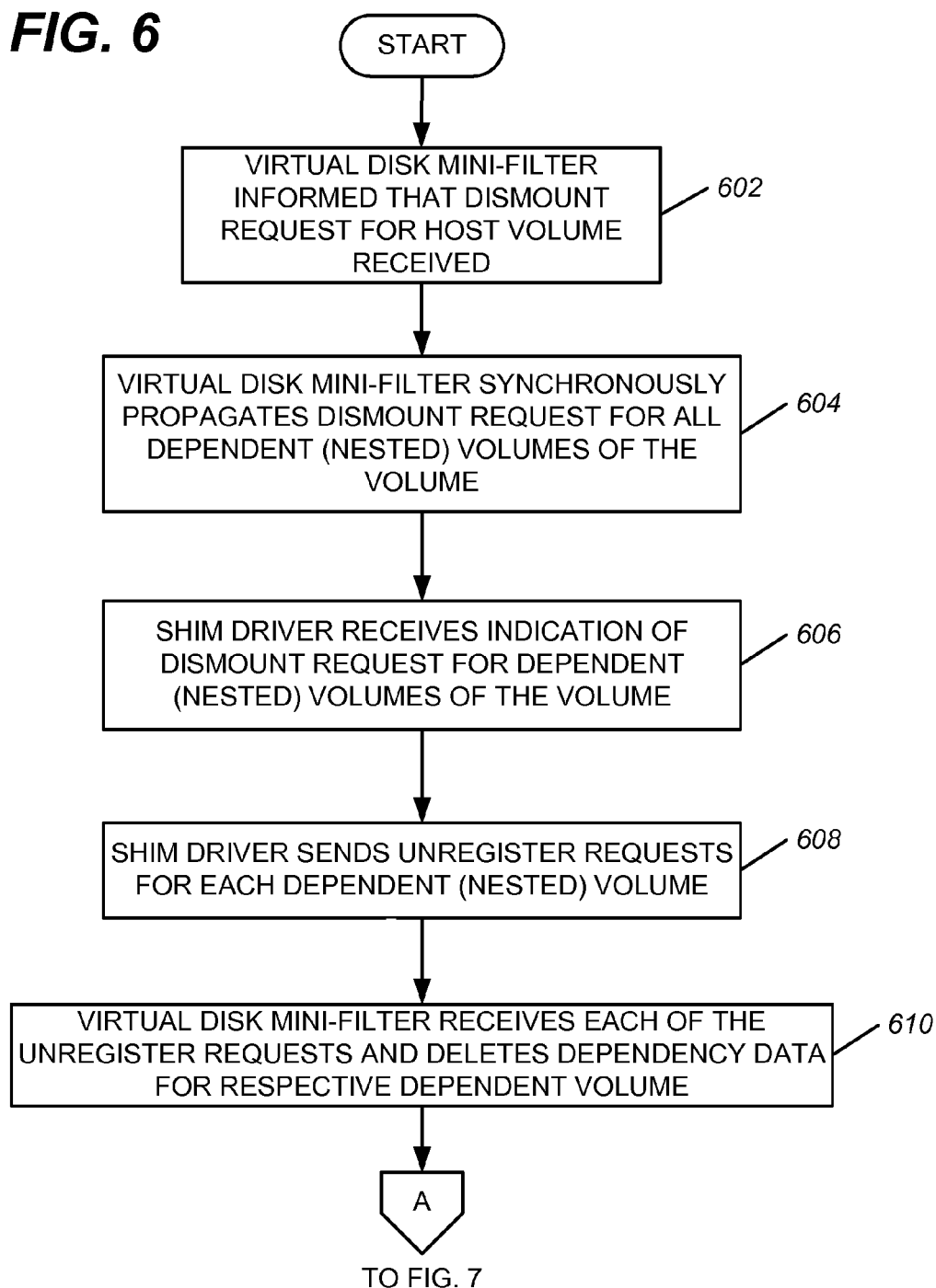
Figure 7:
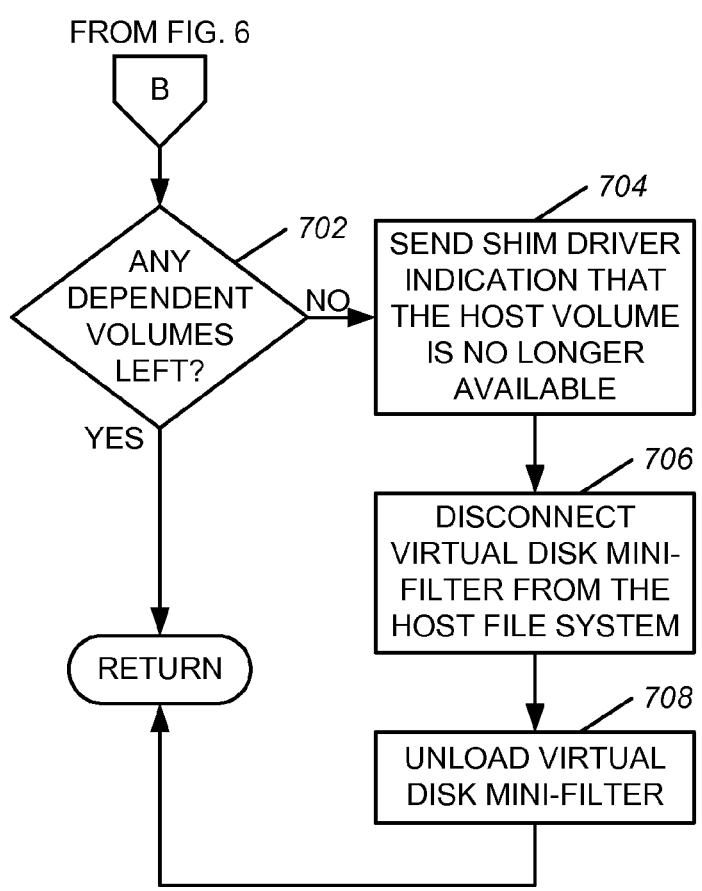

FIGS. 6 and 7 are flowcharts illustrating exemplary processing with respect to dismounting of a host volume having one or more nested, or guest, volumes. The process may begin with virtual disk mini-filter 422 receiving an indication informing virtual disk mini-filter 422 of a dismount request for host volume 432 (act 602). Virtual disk mini-filter 422 may then determine all dependent nested, or guest, volumes of the host volume and may synchronously propagate respective dismount requests for each of the dependent nested, or guest, volumes of the host volume (act 604).

Shim driver 416 may receive respective indications regarding each of the propagated dismount requests (act 606) and may send a respective unregister request for each of the dependent nested, or guest, volumes to virtual disk mini-filter 422 (act 608). Virtual disk mini-filter 422 may receive each of the unregister requests and may delete corresponding dependency data, with respect to the host volume and a respective guest volume, previously saved by virtual disk mini-filter 422 (act 610).

A determination may be made regarding whether the host volume, on which the dependent nested, or guest, volumes resided, has any dependent nested, or guest, volumes remaining (act 702; FIG. 7). If there is no host volume with dependent guest volumes remaining, virtual disk mini-filter 422 may then be disconnected from filter stack 420 and host file system 424 (act 706) and virtual disk mini-filter 422 and may be unloaded (act 708).

Figure 8:
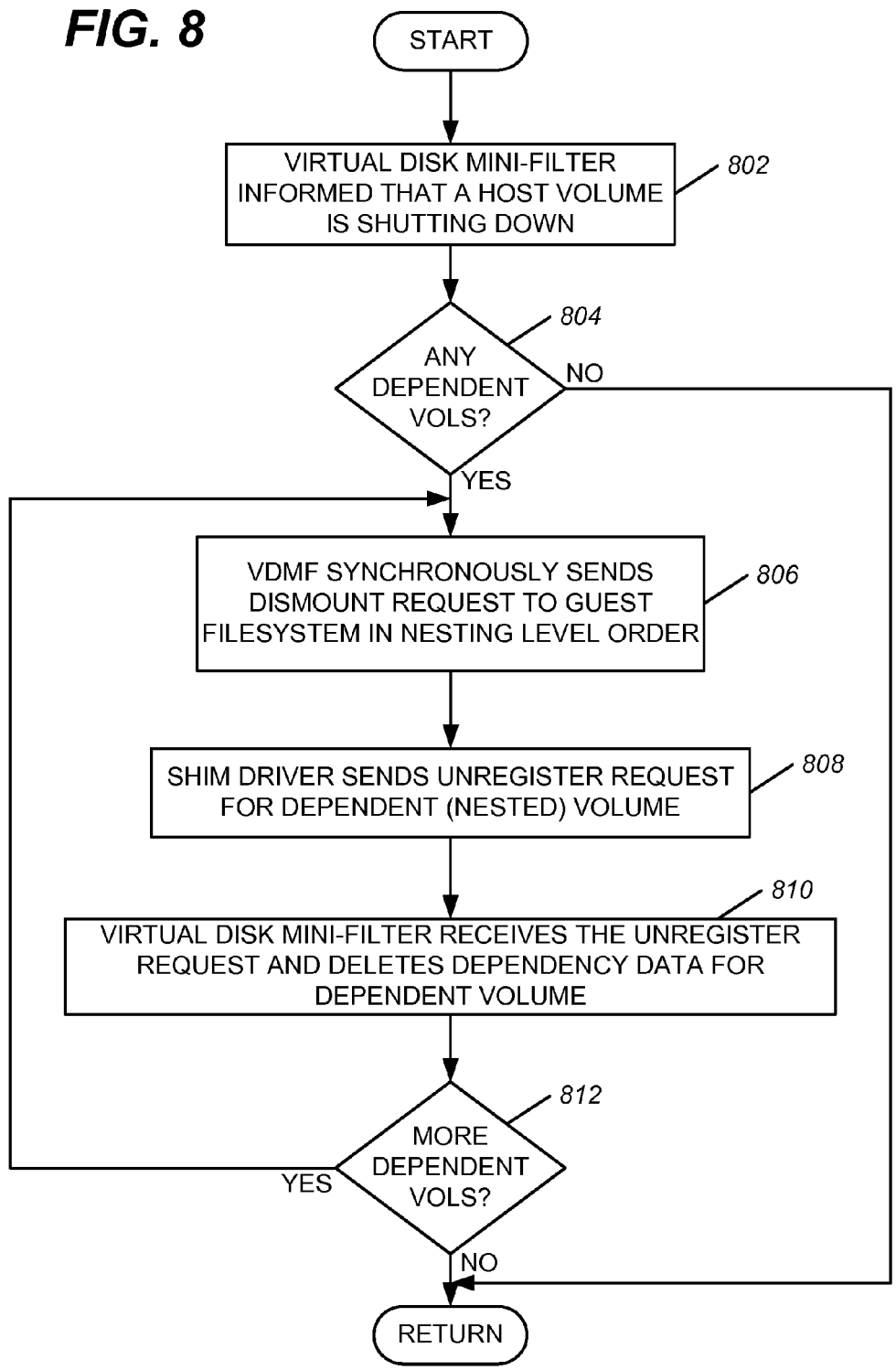

FIG. 8 is a flowchart illustrating exemplary processing with respect to a host volume (432) on a storage device being shutdown as part of a system shutdown. The process may begin with virtual disk mini-filter 422 being informed that a host volume is being shutdown (act 802). For example, a shutdown request for the host volume may be received. A determination may be made regarding whether the host volume 432 has any dependent (nested) volumes (act 804). If there are no dependent volumes, then the process may be completed.

Otherwise, the shutdown request may be synchronously translated to an unregister request, This may be accomplished by virtual disk mini filter 422 synchronously sending a dismount request to guest filesystem 410 in nesting level order (act 806) and shim driver 416 sending an unregister request for a dependent volume (guest volume 400), nested within host volume 432 (act 808).

Virtual disk mini-filter 422 may receive the unregister request for the dependent volume (guest volume 400) and may delete dependency data associated therewith (act 810). A determination may then be made regarding whether host volume 432 has any other dependent guest (nested) volumes (act 812). If no dependent guest volume remains, then the process may be completed. Otherwise, acts 806-812 may again be performed for a next guest volume.

Figure 9:
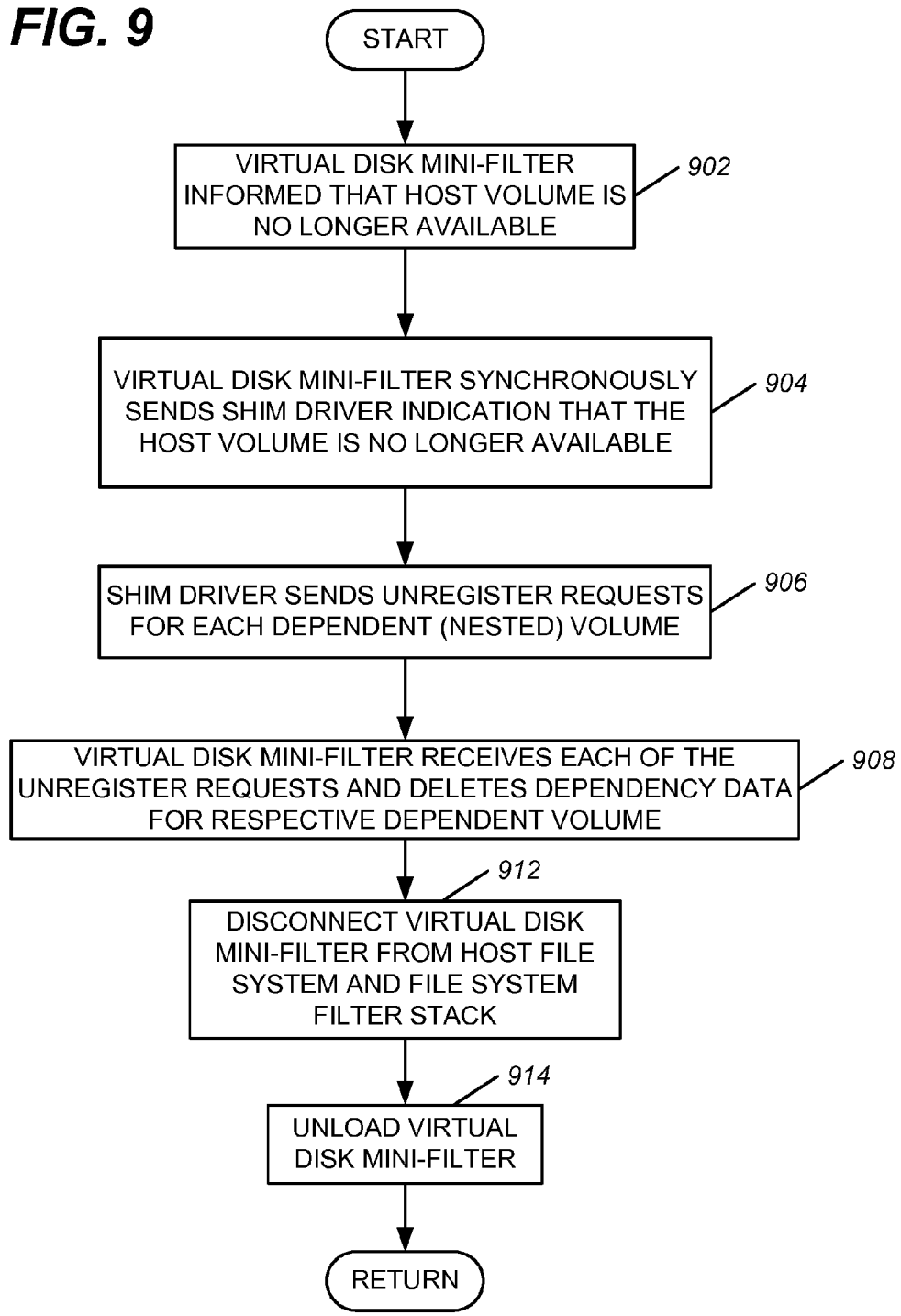

FIG. 9 is a flowchart illustrating exemplary processing with respect to a storage device being unexpectedly detached, or removed, from a processing device. The process may begin with virtual disk mini-filter 422 being informed that a host volume 432 is no longer available (act 902). Virtual disk mini filter 422 may then synchronously send shim driver 416 an indication that the host volume 432 is no longer available (act 904). In some embodiments, the indication that host volume 432 is no longer available may include a list of guest volumes dependent on the host volume.

Shim driver 416 may send an unregister request for each nested, or guest, volume dependent on host volume 432 (act 906). Virtual disk mini-filter 422 may receive respective ones of the unregister requests and may dismount nested file systems on the guest volume before deleting dependency data associated therewith (act 908). If no dependent guest volume remains, then virtual disk mini-filter 422 may be disconnected from host file system 424 and file system filter stack 420 (act 912) and virtual disk mini-filter may be unloaded (act 914).

Figure 10:
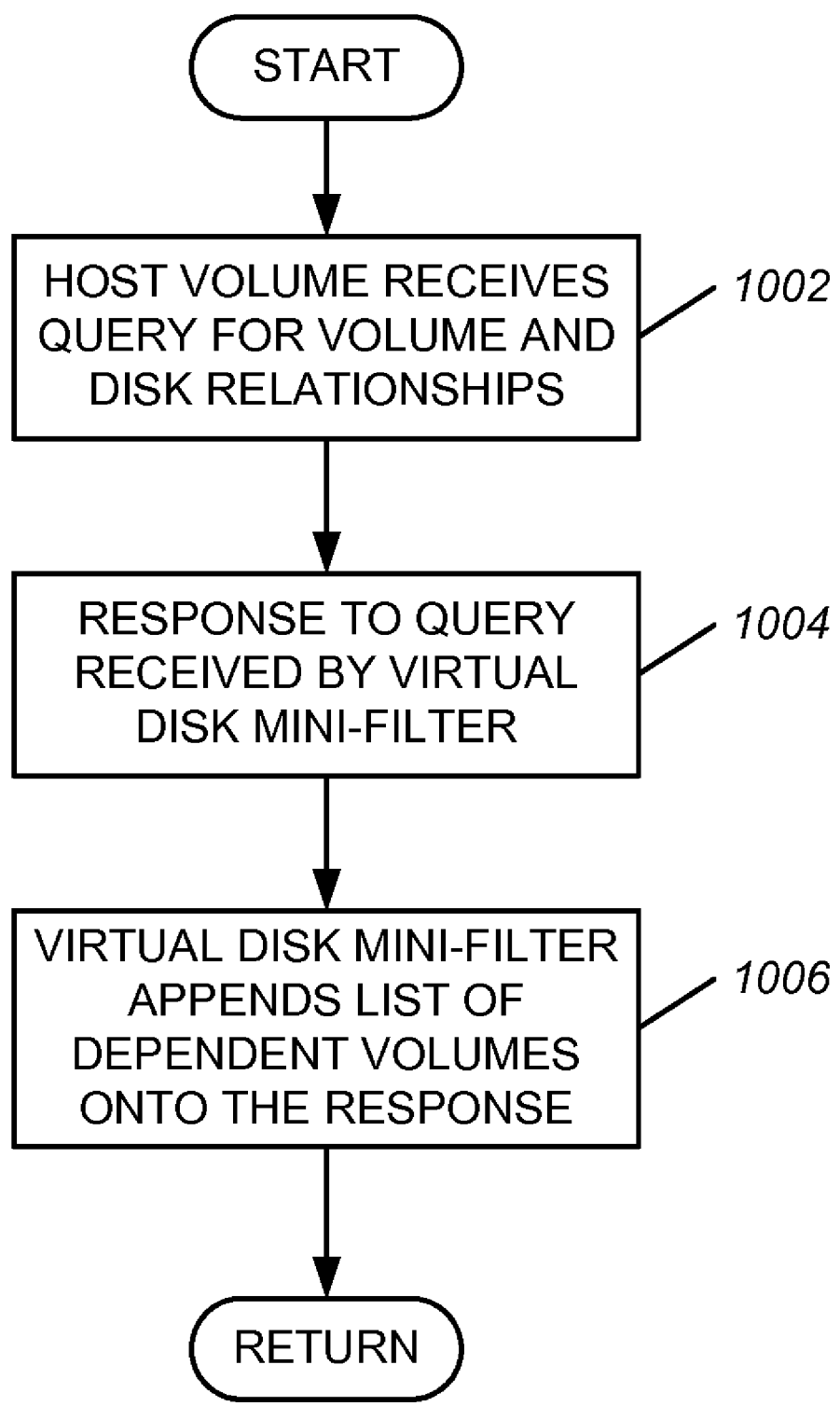

FIG. 10 is a flowchart illustrating exemplary processing regarding processing of a query for device relationships, such as, for example, volume and disk relationships. The process may begin with host volume 432 receiving a query for volume and disk relationships (act 1002). A response to the query may be received by virtual disk mini-filter 422 after being passed through storage filter drivers 426, host file system 424, and file system filter stack 420 (act 904). Virtual disk mini-filter 422 may then append to the response a list of dependent volumes based on saved dependency information (act 1006). In this way, correct guest volumes may be reported as dependent volumes.

The above mentioned embodiments refer to volumes residing on disks and the volumes having guest volumes, nested therein. In other embodiments consistent with the subject matter of this disclosure, the volumes may reside on flash RAM devices, CD ROM, DVD, or any type of block storage device.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. Further, implementations consistent with the subject matter of this disclosure may have more or fewer acts than as described with respect to FIGS. 5-10, or may implement acts in a different order than as shown. Accordingly, the appended claims and their legal equivalents define the invention, rather than any specific examples given.

We claim as our invention:

1. A machine-implemented method for providing nested file system support, the machine-implemented method comprising:
    receiving, at a first component, an indication regarding a surfacing of a disk container format file as a virtual disk residing on a first volume associated with a first file system;
    parsing, by the first component, the disk container format file to expose partitions and volumes included therein,
    opening, by the first component, a second volume included within the disk container format file, the second volume being associated with a second file system, and being nested within the first volume;
    sending, from the first component to a second component, a registration request regarding the second volume;
    tracking file system dependencies, by the second component, by saving information regarding a relationship between the first volume and the second volume; and
    synchronously propagating, by the second component, respective indications regarding unavailability of the first volume to each volume nested within the first volume, when the first volume is being torn down as a result of an unexpected removal of the first volume, wherein the machine-implemented method is performed by a processing device.

2. The machine-implemented method of claim 1, further comprising:
    loading the second component onto a filesystem stack of the first volume only when the first component registers a new volume nested within the first volume.

3. The machine-implemented method of claim 1, further comprising:
    sending, by the first component to the second component, an unregister request, to tear down a relationship between the first volume and the second volume by deleting the information regarding the relationship between the first volume and the second volume when the second volume is dismounted.

4. The machine-implemented method of claim 1, further comprising:
    synchronously translating a shutdown request, with respect to a volume, into an unregister request for a dependent volume nested within the volume.

5. The machine-implemented method of claim 1, further comprising:
    synchronously propagating, by the second component, a dismount request with respect to all volumes nested within the first volume, when the first volume is being torn down in response to a dismount request.

6. The machine-implemented method of claim 1, further comprising:
    appending, by the second component, a list of dependent volumes to a response to a query regarding volume and disk relationships.

7. The machine-implemented method of claim 1, wherein the first component is a shim driver and the second component is a virtual disk mini-filter.

8. A processing device comprising:
   at least one processor; and
   a memory connected to the at least one processor, the memory having instructions recorded therein, such that, when the at least one processor executes the instructions the processing device performs a method, the method comprising:
      receiving, by a first component, an indication of a mounting of a disk volume and information regarding a nested volume completely nested within the disk volume;
      attempting to open, by the first component, the nested volume within the disk volume after the receiving of the indication of the mounting of the disk volume and the information regarding the nested volume within the disk volume and sending, by the first component, a registration request for the nested volume;
      receiving, by a second component, the registration request for the nested volume;
      tracking, by the second component, file system dependencies by saving information with respect to a relationship between the disk volume and all nested volumes within the disk volume;
      receiving, by the second component from the first component in response to informing the first component of dismounting of the disk volume, an unregistration request regarding the nested volume; and
      deleting, by the second component, information regarding a relationship between the disk volume and the nested volume in response to receiving the unregistration request regarding the nested volume.

9. The processing device of claim 8, wherein the first component is a shim driver and the second component is a virtual disk mini-filter.

10. The processing device of claim 8, wherein the method further comprises:
   propagating, from the second component to the first component when the disk volume is being torn down due to a dismount request, respective dismount requests for all nested volumes within the disk volume.

11. The processing device of claim 8, wherein the method further comprises:
   synchronously propagating, by the second component in response to an unexpected removal of the disk volume, respective indications regarding unavailability of the disk volume to all of the nested volumes within the disk volume.

12. The processing device of claim 8, wherein the method further comprises:
   providing information from a host file system, associated with the disk volume, to the second component, the host file system having a host file system filter stack attached thereto.

13. The processing device of claim 12, wherein the method further comprises:
   disconnecting and unloading the second component from the host file system after receiving, from the first component, an unregistration request regarding a last nested volume within the disk volume; and
   deleting information regarding a relationship between the disk volume and the last nested volume after receiving the unregistration request regarding the last nested volume within the disk volume.

14. The processing device of claim 12, wherein the method further comprises:
   appending, by the second component, a list of dependent volumes to a response to a query regarding volume and disk relationships when the host file system stack provides, to the second component, the response to the query.

15. A machine-readable storage medium having instructions recorded thereon for at least one processor, such that when the at least one processor executes the instructions, a method is performed, the method comprising:
   receiving an indication regarding a mounting of a storage device having a volume;
   attempting to read the volume and discovering one or more partitions on the storage device;
   loading a first component after discovering the one or more partitions;
   opening, by the first component, a nested volume within the volume;
   sending, from the first component to a second component, a registration request regarding the nested volume as a result of the opening of the nested volume;
   saving, by the second component, information regarding a relationship between the volume and the nested volume as a result of receiving the registration request;
   sending, by the first component to the second component, an unregister request for the nested volume in response to receiving a dismount request for the nested volume; and
   deleting by the second component, the saved information regarding the relationship between the volume and the nested volume in response to receiving the unregister request.

16. The machine-readable storage medium of claim 15, wherein the method further comprises:
   synchronously propagating, by the second component, the dismount request for the nested volume in response to receiving a dismount request with respect to the volume; and
   receiving, by the first component, the dismount request for the nested volume.

17. The machine-readable storage medium of claim 15, wherein the method further comprises:
   receiving, by the second component, a response to a query regarding volume and disk relationships; and
   appending, by the second component, a list of dependent volumes to the received response.

18. The machine-readable storage medium of claim 15, wherein the method further comprises:
   synchronously sending, by the second component, an indication with respect to each nested volume of the volume that the volume is unavailable, in response to receiving an indication that the volume is unavailable;
   sending, by the first component, a respective unregister request for the each nested volume in response to receiving the indication with respect to the each nested volume that the volume is unavailable;
   receiving, by the second component, the respective unregister request with respect to the each nested volume; and
   deleting, by the second component, the saved information regarding the relationship between the volume and respective ones of the nested volume in response to receiving respective ones of the unregister request.

19. The machine-readable storage medium of claim 15, wherein the method further comprises:

loading the first component upon a first receiving of a registration request for a dependent nested volume of the volume.

20. The machine-readable storage medium of claim 15, wherein the method further comprises:

unloading the second component after information regarding relationships of all dependent volumes of the volume is deleted.

* * * * *